United States Patent
Akagi

(10) Patent No.: US 9,149,893 B2
(45) Date of Patent: Oct. 6, 2015

(54) DEFORMATION PROCESSING APPARATUS AND METHOD FOR CORRECTING SURFACE RUNOUT

(71) Applicant: DENSO CORPORATION, Kariya, Aichi-pref. (JP)

(72) Inventor: Rikizou Akagi, Chita-gun (JP)

(73) Assignee: DENSO CORPORATION, Kiriya (JP)

( * ) Notice: Subject to any disclaimer, the term of this patent is extended or adjusted under 35 U.S.C. 154(b) by 191 days.

(21) Appl. No.: 13/925,068

(22) Filed: Jun. 24, 2013

(65) Prior Publication Data

US 2014/0013817 A1 Jan. 16, 2014

(30) Foreign Application Priority Data

Jul. 10, 2012 (JP) .................. 2012-154515

(51) Int. Cl.
*B21D 3/16* (2006.01)
*B23P 6/00* (2006.01)
*B21D 1/00* (2006.01)
*F16D 27/112* (2006.01)

(52) U.S. Cl.
CPC ... *B23P 6/00* (2013.01); *B21D 1/00* (2013.01); *B21D 3/16* (2013.01); *F16D 27/112* (2013.01)

(58) Field of Classification Search
CPC .............. B23P 6/00; B21D 1/00; B21D 1/06; B21D 1/08; B21D 1/10; B21D 3/10; B21D 3/14; B21D 3/16; B21D 7/06; B21D 22/04; B21D 53/30; B21D 1/12

USPC .............. 72/31.01, 31.02, 31.06, 31.1, 31.13, 72/377, 380, 386, 419, 470–475; 29/894.325, 402.19, 402.05

See application file for complete search history.

(56) References Cited

U.S. PATENT DOCUMENTS

| | | | | |
|---|---|---|---|---|
| 4,819,472 A | * | 4/1989 | Daudi | 72/335 |
| 4,956,989 A | * | 9/1990 | Nakajima | 72/327 |
| 5,722,280 A | * | 3/1998 | Bodnar | 72/186 |

FOREIGN PATENT DOCUMENTS

JP   A-06-291475   10/1994

* cited by examiner

*Primary Examiner* — A. Dexter Tugbang
*Assistant Examiner* — Joshua D Anderson
(74) *Attorney, Agent, or Firm* — Oliff PLC

(57) ABSTRACT

The clutch hub includes a sheet-metal hub member which has an axial member projected from the center of its plate surface, and also includes an annular armature which is fixed to an outer peripheral portion of the axial member. First mounting the axial member of the clutch hub downward on a support member and thereby elastically supporting the end surface of the armature by the support member; holding the axial member of the clutch hub using a chuck; locating a fixing member just under a portion of a maximum runout portion of an inner hub; contacting a cylindrical end surface of a pressing member with an upper surface of the inner hub using pressure; and plastically deforming the inner hub by a pressing force of the pressing member using the locating portion of the fixing member as a fulcrum, which thereby corrects an inclination of the axial member.

16 Claims, 11 Drawing Sheets

RELATED ART

PORTION CONTACTING WITH INNER HUB 11

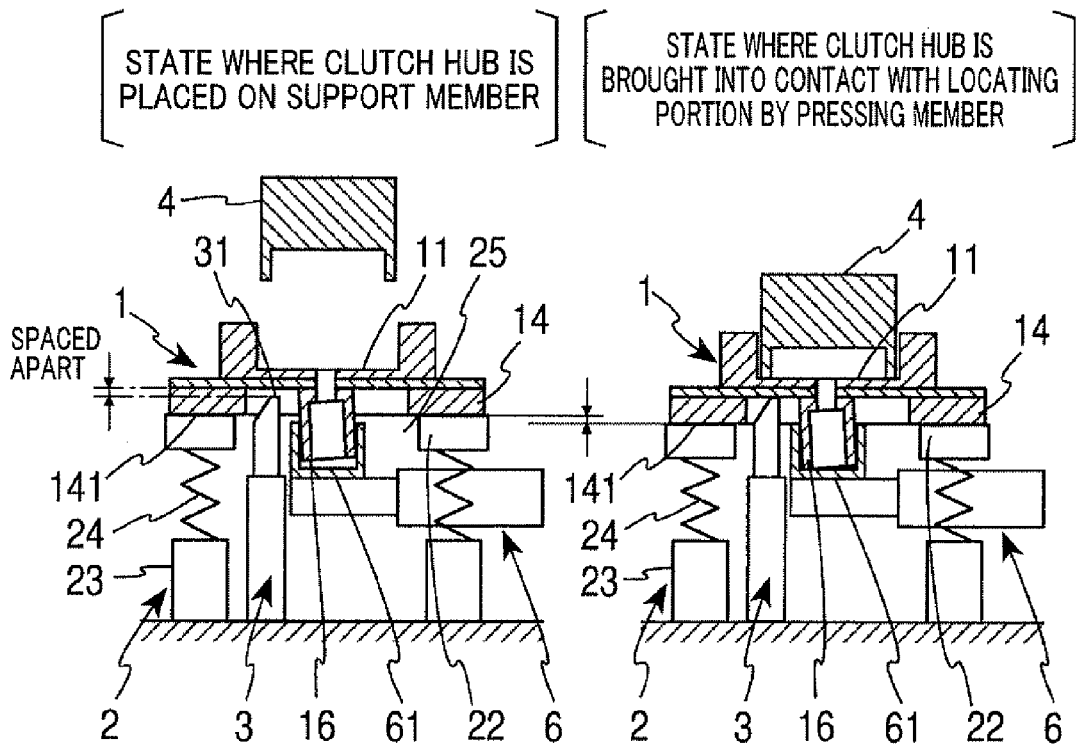
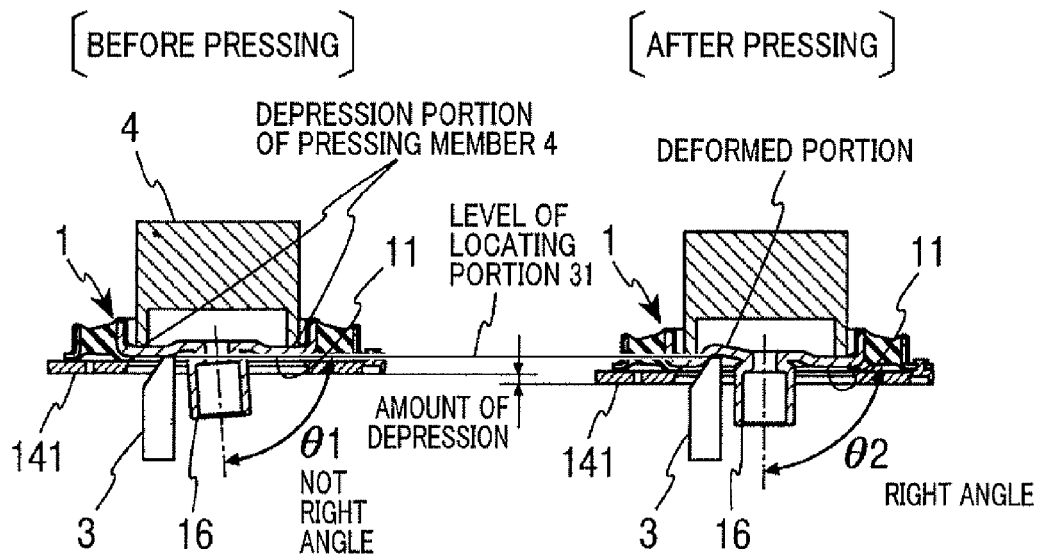

DEFORMATION PROCESSING APPARATUS AND METHOD FOR CORRECTING SURFACE RUNOUT

CROSS-REFERENCE TO RELATED APPLICATION

This application is based on and claims the benefit of priority from earlier Japanese Patent Application No. 2012-154515 filed Jul. 10, 2012, the description of which is incorporated herein by reference.

BACKGROUND

1. Technical Field of the Invention

The present invention relates to a deformation processing apparatus for correcting runout caused in the surface of an armature in a clutch hub which is used for a power transmission device.

2. Related Art

For example, an electromagnetic clutch is used in connecting a compressor of an air conditioner installed in an automobile to an engine that serves as a drive source. An electromagnetic clutch is configured such that an armature of a clutch hub faces a rotor rotated and driven by an engine, and that an inner hub is connected to a compressor-side drive shaft. The armature is attracted to the rotor by an electromagnetic force, while torque is transmitted to the compressor via the inner hub that integrally rotates with the armature.

FIG. 1 is a schematic diagram illustrating a clutch hub. As shown in FIG. 1, a spline shaft of a compressor is ensured to engage with a spline hole 102 which is positioned at the center of a hub member 101. An armature 103 has an annular shape and is riveted to an outer periphery of the hub member 101. In this case, if the accuracy of dimension and the accuracy of assemblage are insufficient, the axis of the hub member 101 will be inclined when the armature 103 is assembled to a rotor. In other words, runout will be caused in an armature surface 104 when the hub member 101 turns around on the axis of the hub member.

That is to say, in order to effectively transmit torque, the armature surface 104 is required to be perpendicular to the spline shaft (i.e. normal line D with respect to an inner end face C of the spline hole 102). Accordingly, as shown in FIGS. 2A and 2B, when runout is caused in the armature surface 104 of the clutch hub (in other words, when the axis of the hub member 101 is inclined), a process of grinding the end surface of the armature 103 and removing the runout has conventionally been performed to suppress the runout so as to be lower than a standard value.

As conventional art, JP-A-H06-291475 discloses a method of performing high-spin deformation processing, instead of performing cutting or grinding, in the course of manufacturing a chassis used for a precision apparatus, so that accuracy of dimension is obtained in a processed sheet-metal product or in a molded product. Specifically, in this method, a mounting seat is provided to a sheet-metal chassis so as to be projected therefrom, followed by pressing a pressing member, which makes a conical runout motion, against the projected surface, thereby reducing the surface level to a predetermined level.

FIGS. 2A and 2B shows a deformation processing method for correcting surface runout of a clutch hub, which is based on conventional grinding, and a relationship between amount of runout and processing time. As shown in FIGS. 2A and 2B, in correcting surface runout using grinding, the amount of grinding increases as the amount of runout is increased. Therefore, a lot of time is spent for the processing, drastically reducing the productivity. On the other hand, while the technique disclosed in JP-A-H06-291475 is effective in entirely reducing the level of a projected portion, it is not suitable for correcting runout in the armature surface of a clutch hub.

It is thus desired to provide an apparatus for correcting surface runout, which is able to accurately and quickly correct runout caused in the armature surface of a clutch hub to enhance productivity.

SUMMARY

As an exemplary embodiment, the present application provides a deformation processing apparatus for correcting surface runout 73. The apparatus is used for correcting runout caused in an end surface of an annular armature of a clutch hub. Such a clutch hub includes a sheet-metal hub member that has an axial member projected from the center of its plate surface, and also includes the annular armature which is fixed to the hub member so as to be located in an outer peripheral portion of the hub member near the axial member.

The apparatus includes a support member, a press mechanism and a fixing member. The support member is used for placing thereon the clutch hub, with the axial member, as an object to be corrected, being oriented downward, and for elastically supporting the end surface of the armature. The press mechanism has a cylindrical pressing member which is positioned above the hub member. The press mechanism allows a driving means to descend the pressing member to press the hub member. The fixing member is positioned below the hub member and includes a locating portion which is opposed to a predetermined position of the plate surface, according to the runout caused in the end surface of the armature.

When a pressing force is applied to the pressing member by the pressing mechanism, the pressing member plastically deforms the plate surface of the hub member by using the locating portion as a fulcrum, and thereby an inclination of the axial member with respect to the end surface of the armature can be corrected. (First aspect of the deformation processing apparatus for correcting surface runout of the present invention)

When runout is corrected using the deformation processing apparatus for correcting surface runout 73 of the present configuration, an amount of runout in the end surface of the clutch hub is measured in advance. Further, the position of the runout is permitted to coincide with the locating portion of the fixing member and then the end surface of the armature is placed on the support member. In this case, the axial member of the hub member is inclined with respect to the axis of the pressing member. Then, when the press mechanism is driven to descend the pressing member and press the hub member of the clutch hub, the entire clutch hub which is elastically supported by the support member is depressed. In this process, a predetermined position of the plate surface of the hub member is pressed against the locating portion of the fixing member. Then, the cylindrical pressing member depresses the outer periphery of the hub member to thereby deform the plate surface, with the locating portion being used as a fulcrum, and corrects the inclination of the axial member.

Accordingly, when an amount of depression of the pressing member is set according to an amount of runout in the end surface of the armature, the end surface of the armature is permitted to be perpendicular to the axial member, thereby correcting surface runout. Accordingly, in the event the amount of runout is comparatively large, it is no longer necessary to spend a lot of time for the correction of the runout, as would have been necessary in the grinding based on the conventional art. As a result, productivity is greatly enhanced.

The deformation processing apparatus for correcting surface runout 73 may preferably include a chuck. The chuck is brought into contact with the side faces of the axial member of the hub member to limit displacement in the rotation direction of the clutch hub. (Second aspect of the deformation processing apparatus for correcting surface runout of the present invention)

According to the apparatus for correcting surface runout having the present configuration, the axial member of the clutch hub is held by the chuck. Accordingly, when the pressing member is pushed down, displacement in the rotation direction of the clutch hub is suppressed. Thus, the contact position, at which the locating portion contacts the plate surface of the hub member, is prevented from being deviated. As a result, surface runout is corrected with good accuracy.

In the deformation processing apparatus for correcting surface runout 73, the support member is configured by a retainer plate and elastic support legs. The retainer plate is brought into contact with the end surface of the armature. Each of the elastic legs includes in its upper portion a spring member that urges the retainer plate upward. (Third aspect of the deformation processing apparatus for correcting surface runout of the present invention)

According to the deformation processing apparatus for correcting surface runout 73 having the present configuration, the support member may specifically have a configuration in which the retainer plate, on which the end surface of the armature is placed, is urged upward by the spring members provided to the elastic support legs. Thus, with the descending of the pressing member, the end surface of the armature can be uniformly and elastically supported.

Further, in the deformation processing apparatus for correcting surface runout 73, the amount of depression of the pressing member given by the press mechanism may be the sum of an amount of plastic deformation which depends on the amount of runout in the end surface of the armature measured in advance and an amount of elastic deformation of the hub member. (Fourth aspect of the deformation processing apparatus for correcting surface runout of the present invention)

According to the deformation processing apparatus for correcting surface runout 73 having the present configuration, the press mechanism sets an amount of depression of the pressing member, taking account of an amount of rebound attributed to the elastic deformation of the hub member. When the amount of elastic deformation is added to the amount of plastic deformation, which depends on the amount of runout in the end surface of the armature, an amount of correction of surface runout corresponding to the amount of plastic deformation is obtained after depression of the hub member.

Further, the locating portion of the fixing member may preferably be arranged on a line connecting between a maximum-runout position in the end surface of the armature measured in advance and the axial member. (Fifth aspect of the deformation processing apparatus for correcting surface runout of the present invention)

According to the deformation processing apparatus for correcting surface runout 73 having the present configuration, the position of the clutch hub is determined so that the maximum-runout position in the end surface of the armature coincides with the position of the fixing member of the clutch hub. Accordingly, when the plate surface is partially deformed, with the locating portion being used as a fulcrum, the axial member is relatively displaced in a direction in which the amount of runout is large, thereby efficiently correcting runout.

Further, the locating portion of the fixing member may preferably be formed on an arc-shaped surface which is coaxial with the hub member. (Sixth aspect of the deformation processing apparatus for correcting surface runout of the present invention)

According to the deformation processing apparatus for correcting surface runout 73 having the present configuration, the locating portion of the fixing member has an arc-shaped surface which is coaxial with the hub member. Thus, when the outer periphery of the plate surface of the hub member is depressed by the coaxially-positioned cylindrical pressing member, the hub member is prevented from being locally imposed with an excessive load. As a result, the load applied to the plate surface, which is in contact with the locating portion, is reduced to thereby enable effective correction of runout.

BRIEF DESCRIPTION OF THE DRAWINGS

In the accompanying drawings:

FIG. 15 shows schematic cross-sectional views illustrating a step of setting the clutch hub in the deformation processing apparatus for correcting surface runout and descending the pressing member, wherein FIG. 15A shows a state where the clutch hub is placed on support member, and FIG. 15B shows state where the clutch hub is brought into contact with locating portion by pressing member;

FIG. 16 shows schematic cross-sectional views illustrating a step of correcting runout performed by the deformation processing apparatus for correcting surface runout, wherein FIG. 16A shows a state before pressing the clutch hub, FIG. 16B shows a state after pressing the clutch hub;

FIG. 17 shows diagrams illustrating a method of determining an amount of depression of the pressing member in a step of deformation processing for correcting surface runout, wherein

DETAILED DESCRIPTION OF THE PREFERRED EMBODIMENTS

Figure 1:
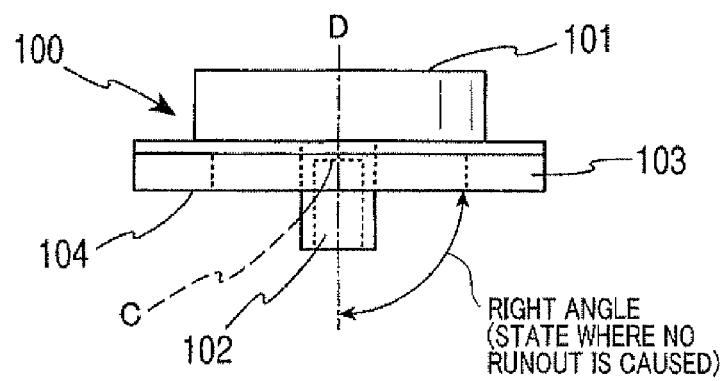
FIG. 1 is a schematic configuration diagram illustrating surface runout of a clutch hub.
Figure 2A:
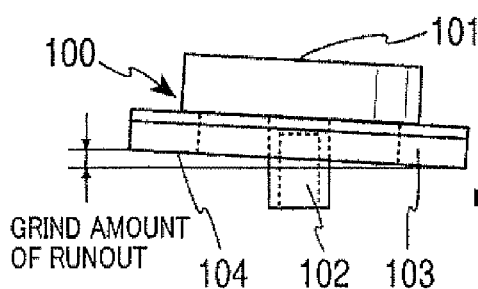
FIG. 2A shows a schematic diagram illustrating a method of deformation processing for correcting surface runout of a clutch hub.
Figure 2B:
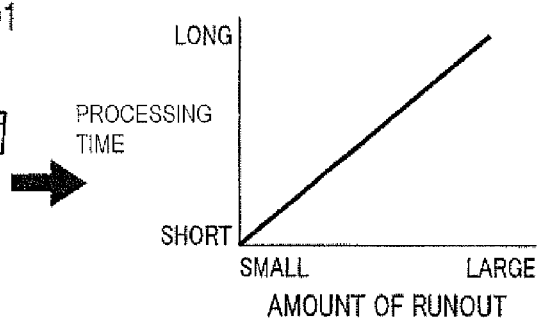
FIG. 2B shows a diagram illustrating a relationship between amount of runout and processing time, respectively according to conventional grinding.
Figure 3:
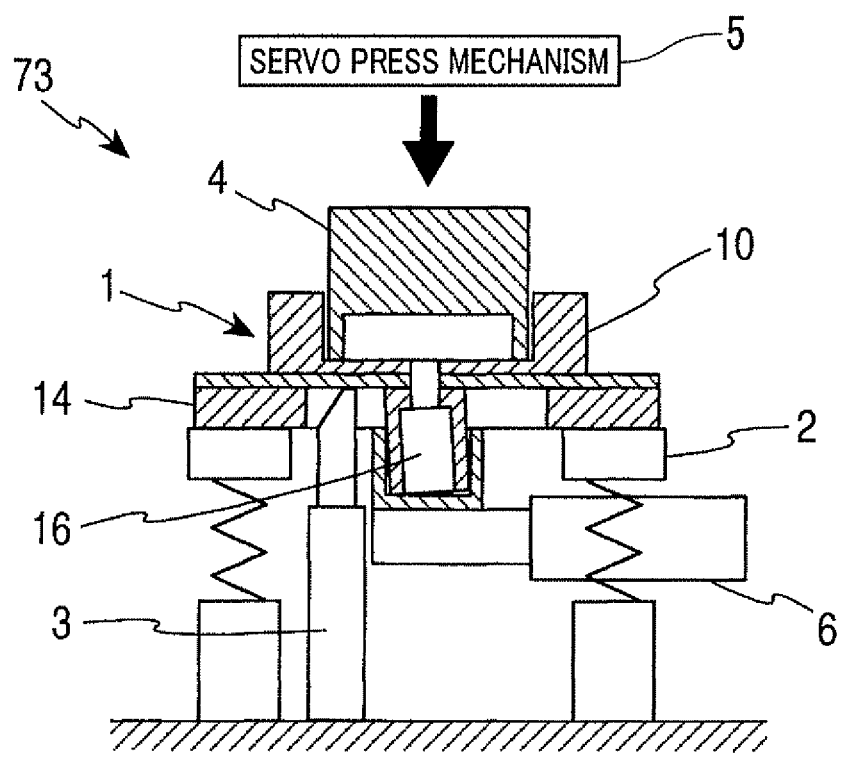
FIG. 3 is a partial cross-sectional view illustrating a schematic configuration of a deformation processing apparatus for correcting surface runout 73, according to a first embodiment of the present invention.

With reference to the accompanying drawings, hereinafter is described a first embodiment of the present invention. FIG. 3 shows a basic structure of a deformation processing apparatus for correcting surface runout 73 of the present invention. The basic structure configures a part of a deformation processing system 50 for correcting surface runout shown in FIG. 4. In FIG. 3, the deformation processing apparatus for correcting surface runout 73 has a clutch hub 1 as an object of correcting surface runout. The apparatus includes a support member 2 and a chuck 6 for supporting the clutch hub 1. The apparatus also includes a fixing member 3 that faces a lower surface of a hub member 10 of the clutch hub 1. The apparatus further includes a cylindrical pressing member 4 that faces an upper surface of the hub member 10 of the clutch hub 1. The apparatus further includes a servo press mechanism 5 as a press mechanism that drives the pressing member 4 for the correction of surface runout. The support member 2 elastically supports an armature 14 of the clutch hub 1, while the chuck 6 holds an axial member 16 of the clutch hub 1.

Figure 4:
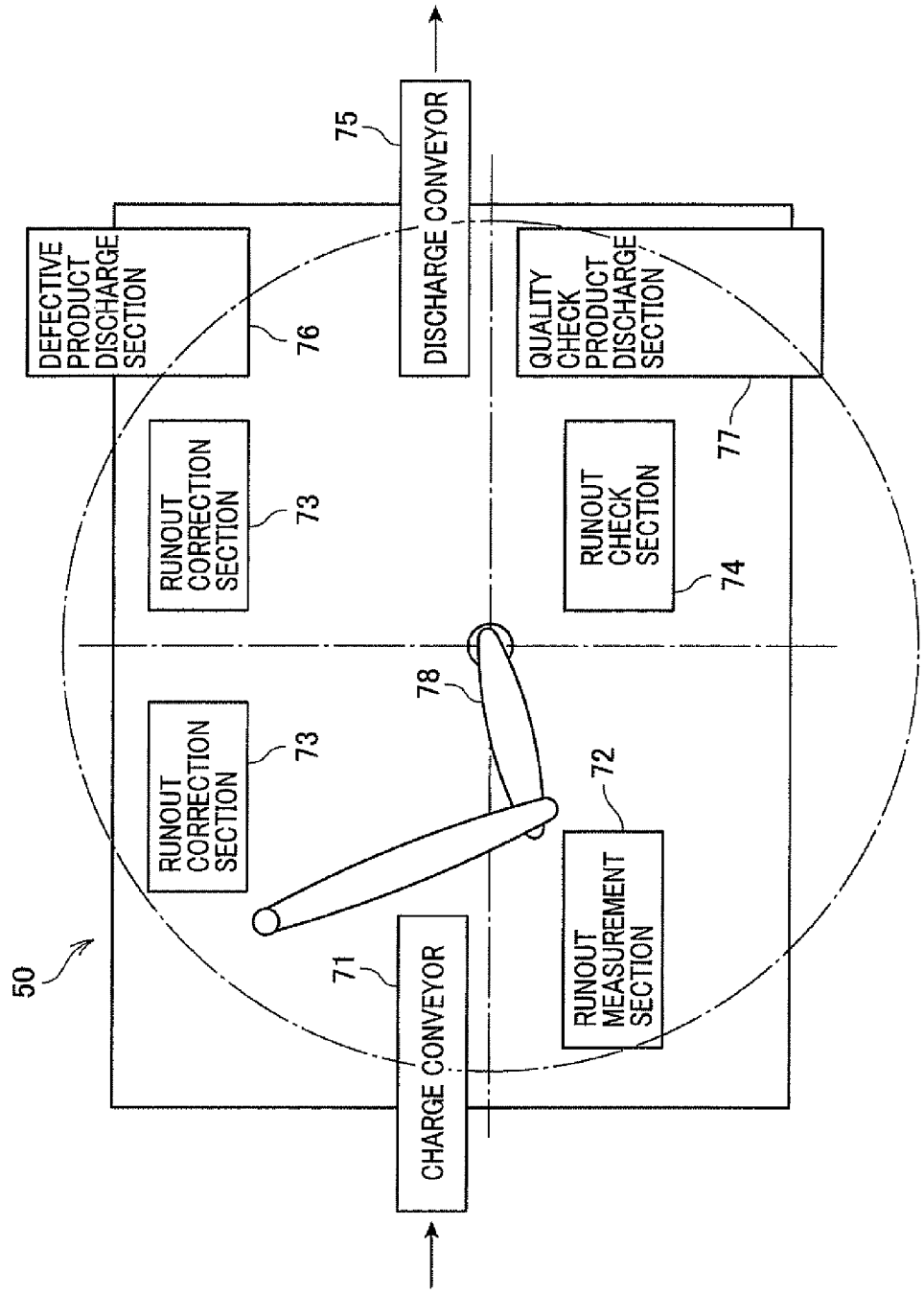
FIG. 4 is a general configuration diagram illustrating a deformation processing system for correcting surface runout, including the deformation processing apparatus for correcting surface runout 73.

FIG. 4 is a schematic diagram of the processing system 50 that includes the deformation processing apparatus for correcting surface runout 73. In the correction processing system 50, the clutch 1 that is an object to be corrected is taken in from a charge conveyor 71, for the measurement of runout in a runout measurement section 72. After that, the clutch hub 1 is positioned so as to be oriented to a predetermined direction and transferred to a runout correction section 73 that corresponds to the deformation processing apparatus for correcting surface runout 73. Hereinafter in the correction processing system 50, the deformation processing apparatus for correcting surface runout 73 referred to as "runout correction section 73". Only one runout correction section 73 may be provided, or, as shown in FIG. 4, two or more runout correction sections 73 may be provided for alternate use to thereby enhance work efficiency. After that, the clutch hub 1 is taken out to the subsequent step from a discharge conveyor 75 via a runout check section 74. If the runout check section 74 determines that a processed product does not satisfy a standard value, the product is ejected, as a defective product, to a defective product discharge section 76. Also, a processed product is periodically ejected to a quality check product discharge section 77 to check quality of products. A delivery member 78, which is a robot arm, is used for conveying products between these sections.

Figure 5:
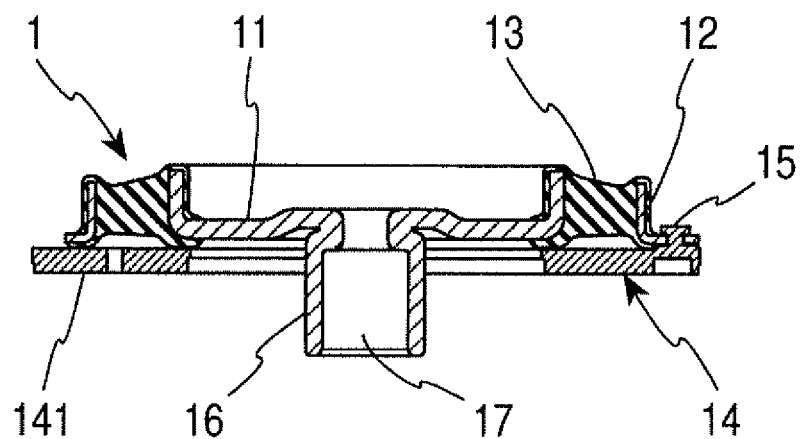
FIG. 5 is a general cross-sectional view illustrating an example of a specific configuration of a clutch hub.
Figures 6A, 6B:
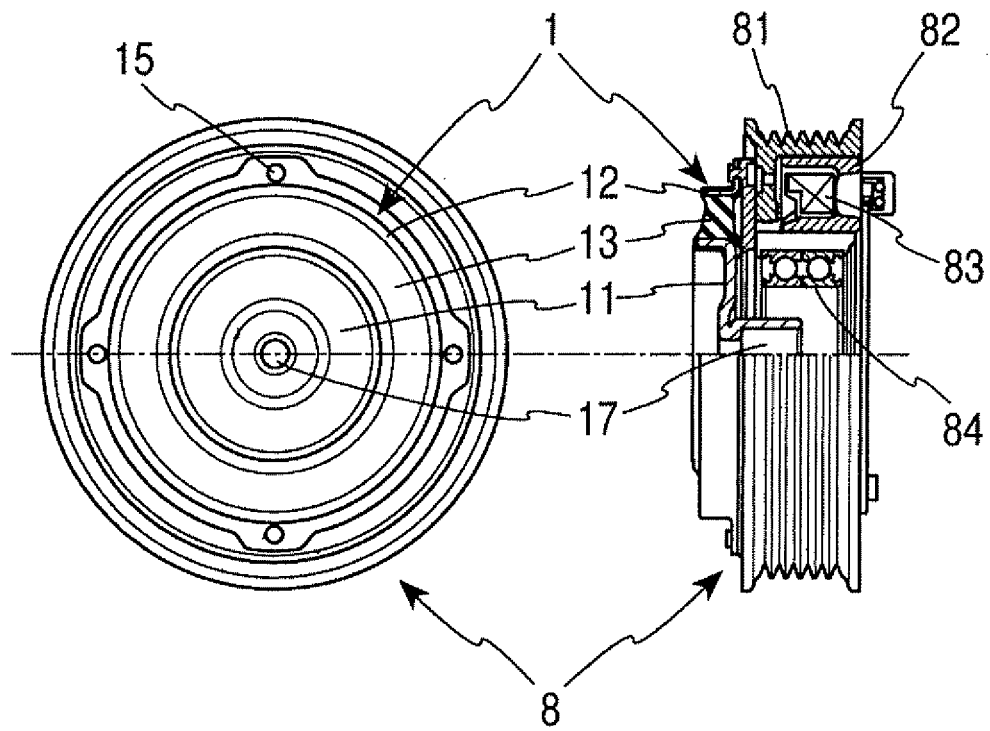
FIG. 6A shows a front view.
FIG. 6B shows a right-side partial cross-sectional view, illustrating an electromagnetic clutch including the clutch hub.

FIG. 5 is a specific structure diagram (center cross-sectional view) of the clutch hub 1. FIG. 6A shows a front view of an electromagnetic clutch 8 that includes the clutch hub 1. FIG. 6B shows a right-side partial cross-sectional view of the electromagnetic clutch 8. In the right-side cross-sectional view, an upper half from the center shows a cross-sectional structure of the electromagnetic clutch 8.

The electromagnetic clutch 8 has the clutch hub 1 that transmits power to the compressor such as of an air conditioner of an automobile. The electromagnetic clutch 8 is integrally connected to a rotary shaft of the compressor via a bolt.

The clutch hub 1 includes the hub member 10 which is formed by connecting an outer hub 12 to an outer periphery of a sheet-metal inner hub 11 via an elastic member 13, such as rubber. Further, the annular armature 14 is fixed, via rivets 15, to a bottom surface of the outer hub 12 that forms an outer peripheral surface of the hub member 10.

The armature 14 is arranged, via a gap, opposed to a friction surface of a rotor 81 that configures the electromagnetic clutch 8. The armature 14 is attracted to the rotor 81 by an electromagnetic force of an electromagnetic coil 83 which is accommodated in a stator 82.

The axial member 16 of the inner hub 11 is provided being projected from the center of the plate surface near the armature 14. The axial member 16 is provided in the inside thereof with a spline hole 17 through which the axial member 16 is spline-connected to the rotary shaft of the compressor. Thus, the axial member 16 transmits the torque of the rotor 81, which is rotated by the torque of an engine of the automobile, to the rotary shaft. The rotor 81 is rotatably fixed with a compressor housing via a bearing 84.

The clutch hub 1 has a structure in which the armature 14, as a separate member, is fixed, via rivets, to the hub member 10 composed of the inner hub 11 and the outer hub 12, which are obtained by sheet-metal processing. Therefore, the structure raises a problem of surface runout. The surface runout is caused in the end surface of the armature 14 (hereinafter referred to as "armature surface 141") that faces the friction surface of the rotor 81. For this reason, the surface runout of the armature 14 with respect to the axis of the inner hub 11 is required to be measured and corrected after the assemblage of the armature 14. A flow of correcting the runout is shown in FIG. 5.

In the deformation processing system 50 for correcting surface runout shown in FIG. 4, the clutch hub 1 that has been taken in from the charge conveyor 71 is transferred to the runout measurement section 72 by the delivery member 78. Thus, runout is measured, at step S1 of FIG. 7, in the runout measurement section 72. FIG. 8 shows an example of a specific configuration of the runout measurement section 72. The runout measurement section 72 includes a reference pin 85 which is threadably inserted from below into the spline hole 17 of the clutch hub 1. The runout measurement section 72 also includes a work presser 86 that presses the inner hub 11 from above. The reference pin 85 is made rotatable about its axis by a work rotating motor 87. The work presser 86 is arranged, sandwiching the inner hub 11 between itself and the reference pin 85, so as to be coaxial with the reference pin 85 and be vertically movable. Opposed to the lower end surface of the armature 14 (armature surface 141), a runout measuring sensor 88 and a rivet hole detecting sensor 89 that detects the position of a rivet hole 151 are arranged. For example, the runout measuring sensor 88 and the rivet hole detecting sensor 89 are laser sensors. The work rotating motor 87 is a servo motor.

Figures 9A, 9B:
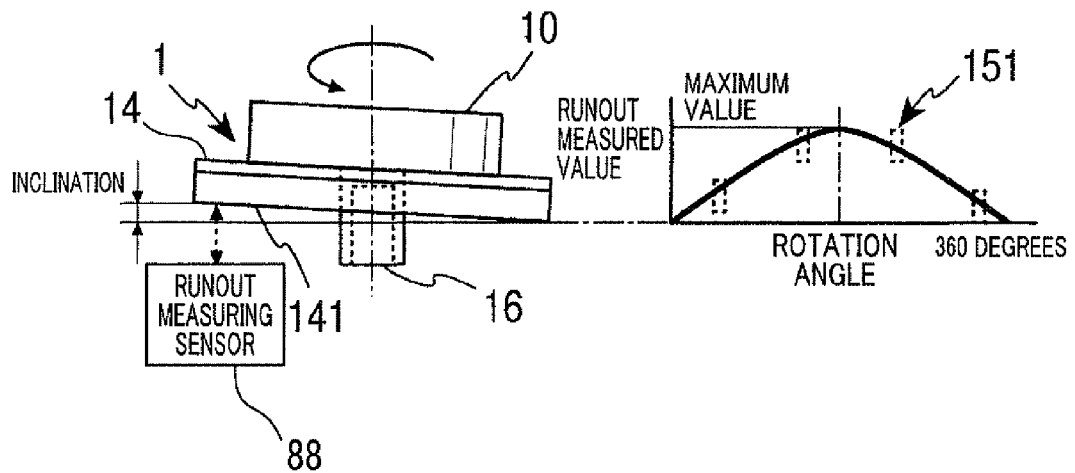
FIG. 9A shows a schematic cross-sectional view illustrating the runout measurement section for the method of correcting runout.
FIG. 9B shows a diagram illustrating an example of a result of measurements of runout.

The inner hub 11 of the clutch hub 1 has a center portion which is held between the work presser 86 and the reference pin 85. The reference pin 85 is rotated by the work rotating motor 87 to allow the runout measuring sensor 88 to measure a distance to the armature surface 141. In this case, if no runout is caused in the armature surface 141, the measured distances are uniform. However, as shown in FIG. 9A, if the armature surface 141 has an inclination with respect to a plane perpendicular to the axial member 16 of the hub member 10, runout will be detected with respect to the rotation angle. The rotation angle is managed by an encoder of the work rotating motor 87. The encoder acquires the detection results of the runout measuring sensor 88 to calculate an amount of runout and determine a rotation angle having a maximum value (see FIG. 9B). In this case, since the shape around each rivet hole 151 may be deformed, the positions of the rivet holes 151, which are detected by the rivet hole detecting sensor 89, are removed from the calculation of runout. The range of removal may be arbitrarily determined. For example, measured values may be stored such as in a sequencer to prepare data relative to angles. Thus, depending on the degree of deformation of the rivet hole 151, the range of removal may be increased with respect to the edge of the rivet hole 151. In this way, the accuracy of measuring runout can be enhanced.

Figure 7:
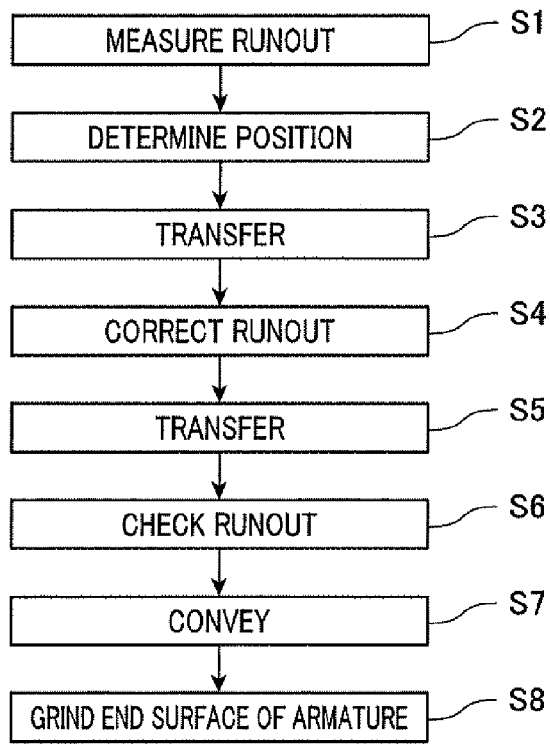
FIG. 7 is a diagram illustrating processing steps in a method of correcting runout, performed by the system for correcting runout.
Figure 8:
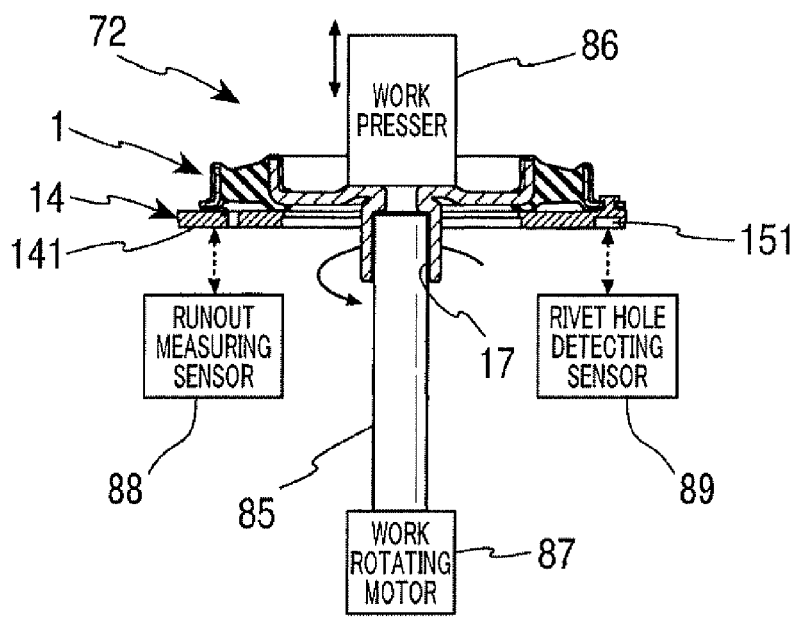
FIG. 8 is a schematic cross-sectional view illustrating a state where the clutch hub is mounted to a runout measurement section.
Figure 10:
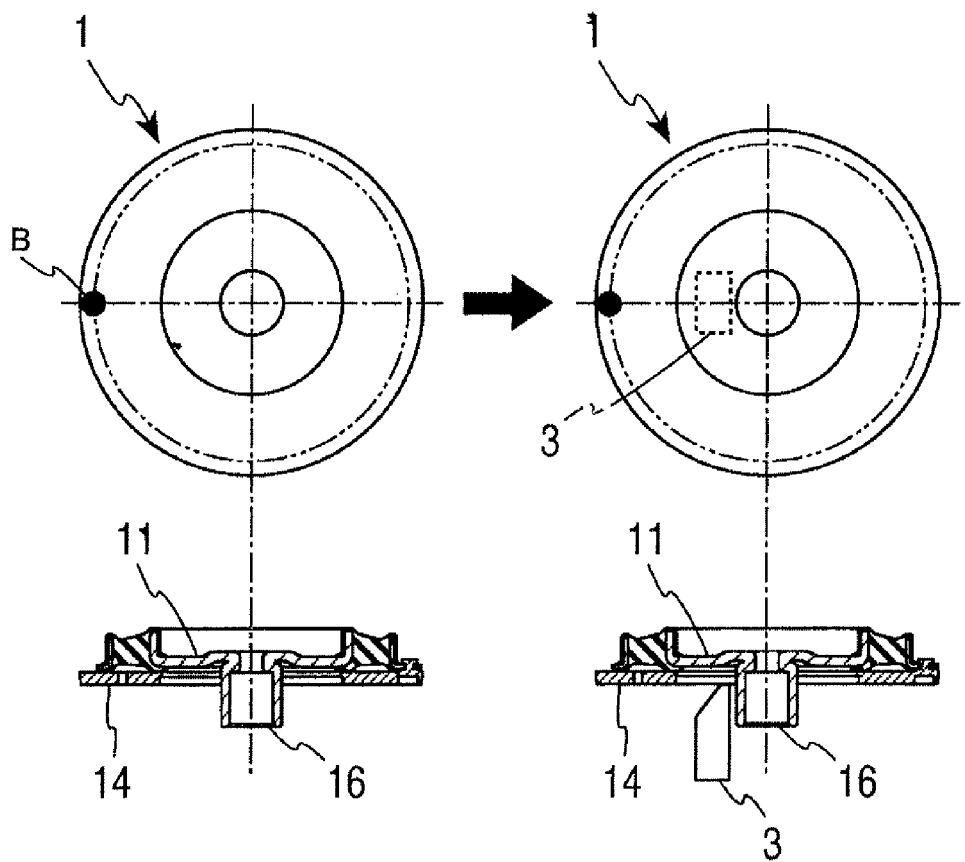
FIG. 10 shows schematic diagrams illustrating a method of determining position performed in the runout measurement section.

At step S2 of FIG. 7, the runout measurement section 72 determines a position so that the value of the encoder (rotation angle), which corresponds to the maximum value of the detected runout, coincides with the angle of the fixing member 3 in the subsequent runout correction section 73. In other words, as shown in FIG. 10 on the left, in determining a position, a maximum-runout portion B indicated by the black circle is ensured to be constantly located at a predetermined rotation angle position with respect to the center of the inner hub 11. Then, the clutch hub 1 is stopped at such a position. Instead of the maximum-runout portion B, a minimum-runout portion may be ensured to be located at a predetermined position. Then, at step S3 of FIG. 7, keeping the predetermined rotation angle position, the delivery member 78 transfers the clutch hub 1 to the runout correction section 73. In this case, as shown in FIG. 10 on the right, the maximum-runout portion B, the inner hub 11 and the fixing member 3 of the runout correction section 3 are ensured to be aligned on a line. Thus, the position is optimized for the fixing member 3 to correct runout of the armature surface 141. When the minimum-runout portion is ensured to be located at a predetermined position, the fixing member 3 is brought to a position opposite to the one shown in FIG. 10.

Figure 11:
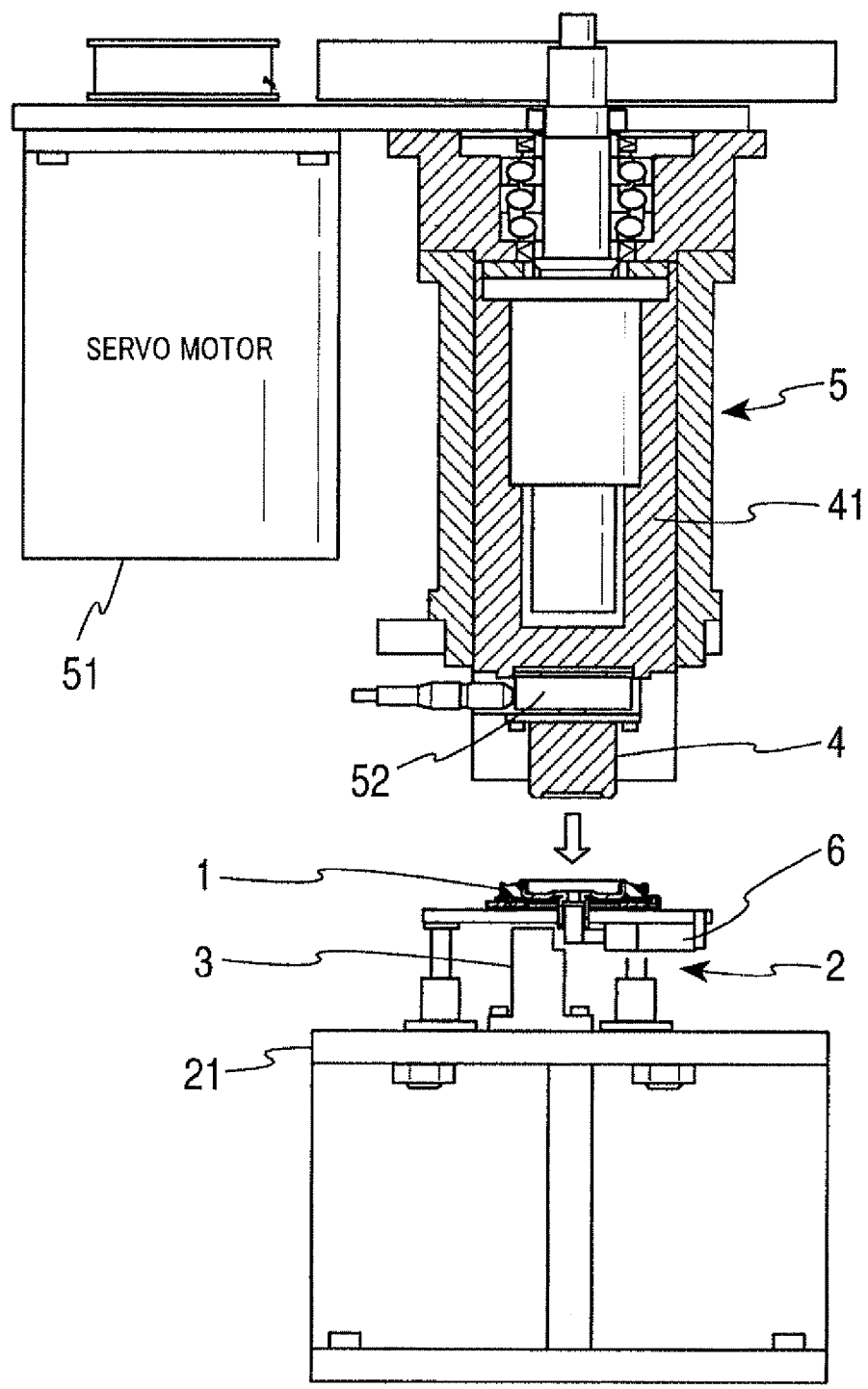
FIG. 11 is a partial cross-sectional view illustrating an example of a specific configuration of the deformation processing apparatus for correcting surface runout.
Figure 17A:
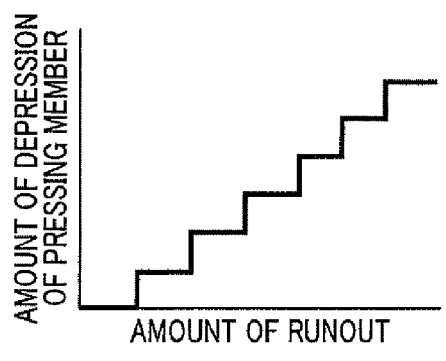
FIG. 17A shows a relationship between amount of runout and amount of depression of a pressing member and FIG. 17B shows a relationship between amount of deformation of the clutch hub and amount of depression of a pressing member.
Figure 17B:
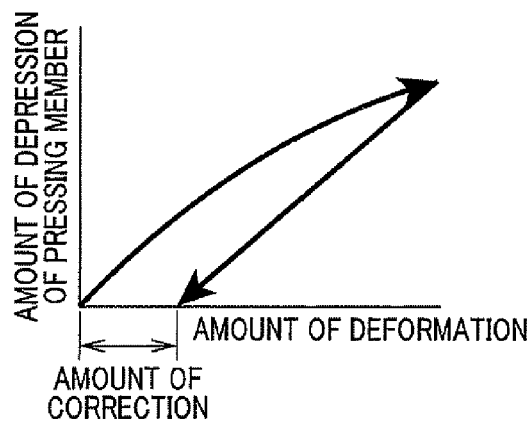

FIG. 11 and FIG. 12 show an example of a specific configuration of the deformation processing apparatus for correcting surface runout 73. In FIG. 11, the support member 2 that elastically supports the clutch hub 1 is fixed onto a base 21. Above the clutch hub 1, the pressing member 4, which is supported by a movable member 41 of the servo press mechanism 5, is coaxially positioned. The movable member 41 is movable in vertical and horizontal directions by a servo motor 51 that serves as a driving means. The movable member 41 determines a position, with respect to the clutch hub 1, of the pressing member 4 mounted to an end thereof, while being able to apply a pressing force to the clutch hub 1 with a predetermined load. A load cell 52 is arranged above the pressing member 4 to enable detection of load. The fact that the pressing member 4 has been brought into contact with the inner hub 11 and then has depressed the inner hub 11 to bring it into contact with the fixing member 3, can be confirmed by detecting the change in the load of the load cell 52. Thus, an amount of depression of the pressing member 4 is correctly controllable as shown in FIG. 17A and FIG. 17B that will be referred to later.

Figure 12A:
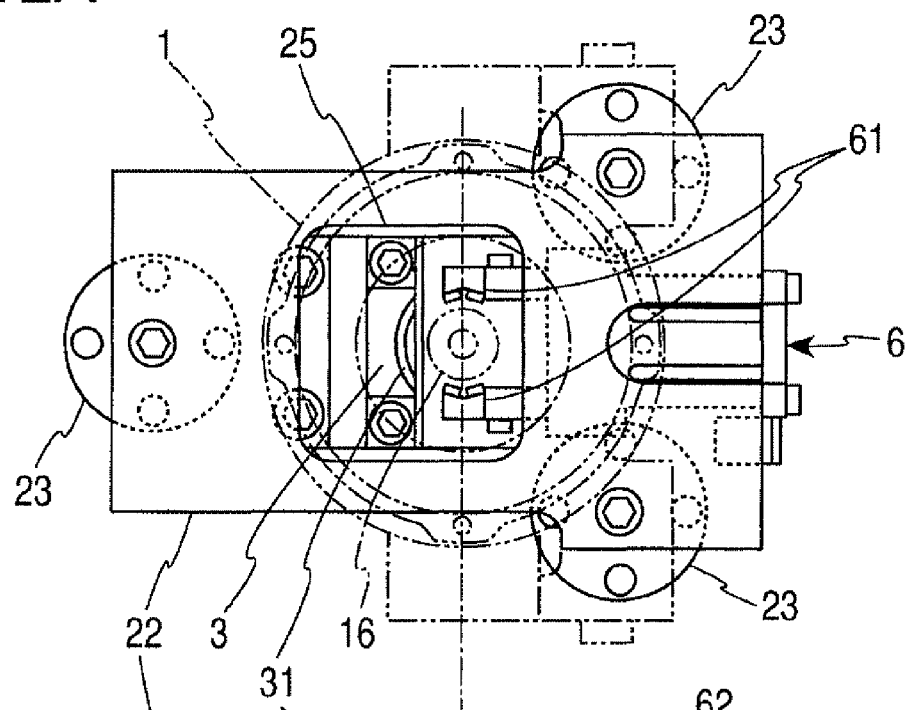
FIG. 12A shows a general plan view and FIG. 12B shows a side view, illustrating an example of a specific configuration of the deformation processing apparatus for correcting surface runout.
Figure 12B:
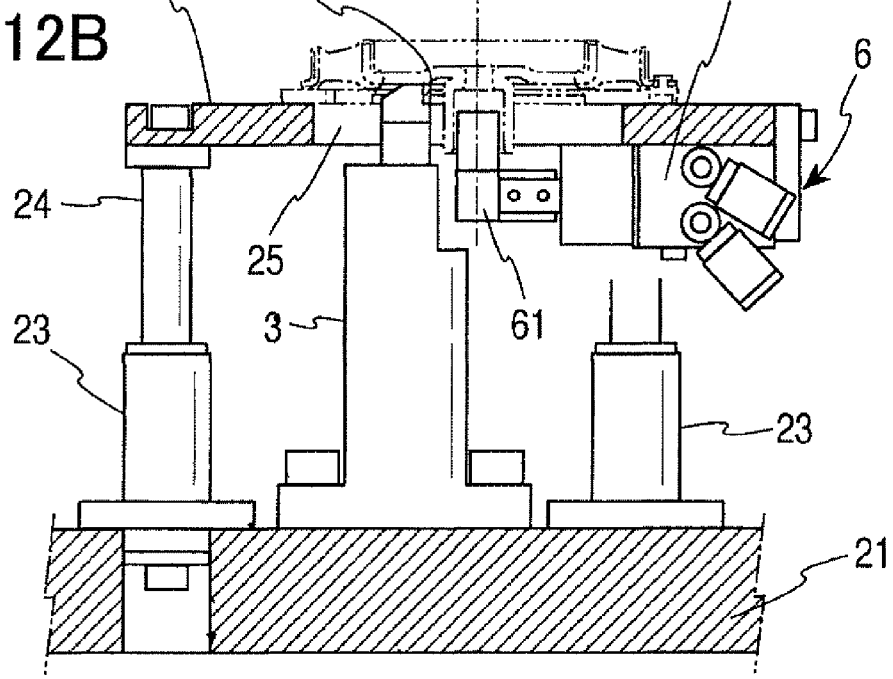

In FIG. 12A and FIG. 12B, the support member 2 is configured by fixing a retainer plate 22 to a plurality of elastic support legs 23 which are set up on the base 21. The clutch hub 1 is placed on an opening edge portion of an opening 25 which is provided at the center of the retainer plate 22. It is so configured that the axial member 16 of the clutch hub 1 is projected downward through the opening 25 and that a pair of chuck members 61 of the chuck 6 are located lateral to the axial member 16.

The retainer plate 22 has a substantially rectangular shape. In the present embodiment, three elastic support legs 23 are mounted to the retainer plate 22, two on the right end and one on the left end as viewed in the figure, to support the retainer plate 22 at three points. An air cylinder 62 is fixed to the lower surface of the retainer plate 22, being positioned between the two elastic support legs 23 on the right end, to open/close the chuck members 61. Each of the elastic support legs 23 incorporates a spring member 24 in its upper end portion to urge the retainer plate 22 upward. When the pressing member 4 is pushed down, the upper end portion of each elastic support leg 23 can be displaced downward by an amount corresponding to the contraction margin of the spring. Thus, the upper end portion of each elastic support leg 23 is ensured to allow the retainer plate 22 to descend, while elastically supporting the clutch hub 1. The opening 25 has a substantially rectangular shape, with its right half, as viewed in the figure, facing the chuck members 61 and the left half facing the fixing member 3. The fixing member 3, which is fixed onto the base 21, has an upper end portion provided with a locating portion 31 that contacts and supports the inner hub 11 of the clutch hub 1.

Figure 13:
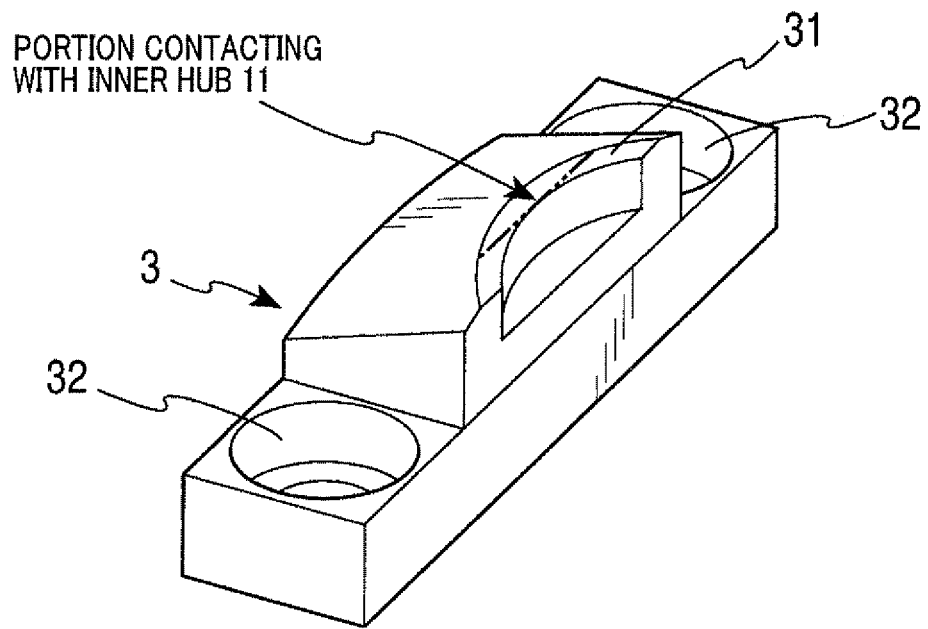
FIG. 13 is a general perspective view illustrating a fixing member.

FIG. 13 is a diagram illustrating a specific configuration of the fixing member 3. A bolt hole 32 for fixation is formed at both ends of the fixing member 3 in the longitudinal direction. The center portion of the fixing member 3 is projected upward and has an inclined upper end surface in which the locating portion 31 having an arc shape is formed. As shown in FIG. 12A and FIG. 12B, the arc-shaped locating portion 31 is formed in an upper end portion near the chuck members 61 so as to have a predetermined width and be coaxial with the axial member 16 of the clutch hub 1. The upper end surface of the fixing member 3 is inclined from the arc-shaped locating portion 31 toward the opening edge portion of the opening 25 to form an inclined surface that smoothly inclines downward and outward from the arc. The fixing member 3 has a side face near the chuck members 61, in which an arc-shaped recess that continues from the locating portion 31 is formed to avoid interference with the clutch hub 1.

In this way, by forming the locating portion 31 into an arc-shaped surface, the load imposed at the time of correcting runout is prevented from being concentrated on a specified portion. The locating portion 31 is not necessarily required to have an arc or flat surface. Alternative to this, the entire upper surface of the fixing member 3 may be formed into a gently projected shape.

Figure 14:
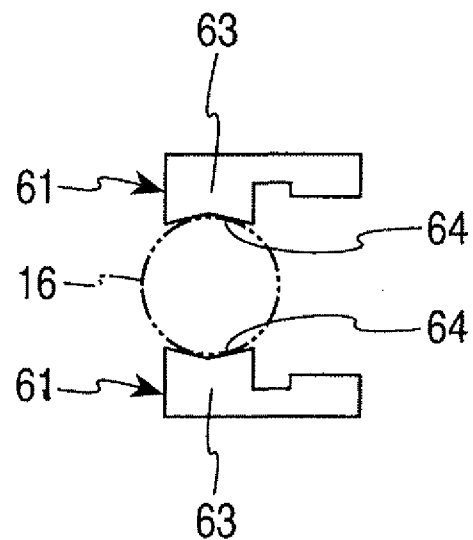
FIG. 14 is a diagram illustrating the shape of a chuck member of a chuck.

FIG. 14 is a diagram illustrating a specific configuration of the pair of chuck members 61. The chuck members 61 have respective ends provided with claws 63 which are ensured to hold the axial member 16 of the clutch hub 1 from both sides. The pair of claws 63 have respective inner surfaces 64 that are opposed to each other via the axial member 16. The inner surfaces 64 are each formed into a gentle concave surface that has a curvature radius larger than the outer diameter of the axial member 16. In correcting runout, the claws 64 hold the axial member 16 to limit the rotation of the clutch hub 1. The chuck members 61 only have to prevent the clutch hub 1 from being rotated by the pressing force of the pressing member 4 and thus to prevent the correcting position from being displaced. For this reason, the chuck members 61 are permitted to have a comparatively small holding force. Thus, in a state of being supported between the pair of claws 63, the axial member 16 of the clutch hub 1 can be displaced in the vertical or horizontal direction with the depression and deformation of the inner hub 11.

Referring now to the schematic diagrams of FIGS. 15A and 15B and FIGS. 16A and 16B hereinafter is described step S4 in FIG. 7, a method of correcting runout of the armature surface, performed by the runout correction section 73. FIG. 15A on the left shows a state where the clutch hub 1 is placed on the support member 2 of the runout correction section 73. In this state, the pressing member 4 is located above the inner hub 11 of the clutch hub 1 so as to be coaxial with the center of the armature surface 141 and the chuck members 61. The clutch hub 1 is placed so that the armature surface 141 is in contact with and supported by the retainer plate 22 and that the axial member 16 projected downward through the opening 25 is held by the pair of chuck members 61. Specifically, as described above, the clutch hub 1 is placed so that a portion of the armature surface 141, the portion having a maximum amount of runout, faces the fixing member 3. Further, in this state, the locating portion 31 of the fixing member 3 is not in contact with the inner hub 11, and thus the lower surface of the inner hub 11 facing the opening 25 is spaced apart from the fixing member 3.

From this state, when the servo press mechanism 5 is driven to descend the pressing member 4, an end surface of the cylindrical pressing member 4 (lower end surface in the figure) firstly comes into contact with the upper surface of the inner hub 11 of the clutch hub 1. Then, as shown in FIG. 15B on the right, the lower surface of the inner hub 11 comes into contact with the locating portion 31 of the fixing member 3. The contact portion between the locating portion 31 and the inner hub 11 in this case is indicated by the dash-dot-dot line in the surface of the locating portion 31 shown in FIG. 13. The contact position (position during the descending of the servo press) can be detected by detecting the change in the load of the load cell 52 shown in FIG. 11. As shown in FIG. 16A and FIG. 16B, the pressing member 4 is further descended to bring the inner hub 11 into partial contact with the locating portion 31 of the fixing member 3. With this contact being kept, the pressing member 4 is further pushed down until an outer peripheral portion of the inner hub 11 in contact with the pressing member 4 is depressed by a certain distance.

In FIG. 16A on the left, the axial member 16 of the clutch hub 1 before runout correction (before pressing) is not perpendicular to the horizontal armature surface 141 (inclination θ1). In this state, the clutch hub 1 suffers from runout. In this case, the end surface of the cylindrical pressing member 4 is in contact with an outer peripheral edge portion of the upper surface of the inner hub 11, the outer peripheral edge portion being located on an inner peripheral side of the armature 14 placed on the retainer plate 22, which corresponds to an outer peripheral side with reference to the contact position at which the inner hub 11 contacts the locating portion 31.

As shown in FIG. 16B on the right, when the pressing member 4 is descended as it is, the outer peripheral portion of the inner hub 11 is depressed. Accordingly, deformation can be caused in the plate surface of the inner hub 11 at the contact position, at which the inner hub 11 contacts the locating portion 31. In other words, as shown in the figure, the plate surface of the inner hub 11 is bent and deformed in the cross section passing through the contact position, and inclined with respect to the horizontal plane. Accordingly, the axial member 16 is relatively displaced toward the fixing member 3. As a result, the angle between the horizontal armature surface 141 and the axial member 16 (inclination θ2) is increased.

Accordingly, the inclination θ2 is permitted to form substantially a right angle by appropriately setting the amount of depression of the pressing member 4 according to the amount of runout measured in advance, thereby correcting the runout caused in the armature surface 141. However, the amount of deformation of the sheet-metal inner hub 11 is the sum of the amount of elastic deformation and the amount of plastic deformation. The amount of elastic deformation, which rebounds after removing the load, is not reflected in the amount of correction. For this reason, as the amount of runout becomes larger, the amount of depression is increased. At the same time, the amount of depression of the pressing member 4 (amount of depression) is determined, taking account of the amount of rebound after deformation. This relationship is shown in FIG. 17B on the right.

Specifically, as shown in FIG. 17A on the left, the amount of runout is ranked into several stages. After that, an amount of depression required for permitting the inclination θ2 after correction to form a right angle is preset for each rank. Then, based on the measurement performed by the runout measurement section 72, the pressing member 4 is driven so as to achieve the amount of depression corresponding to the rank. The axial member 16 of the clutch hub 1, which is held by the chuck members 61, is able to slide between the pair of claws 63 as the amount of inclination of the axial member 16 changes in the course of correcting runout. Therefore, the operation of correction will not be prevented.

After that, at steps S5 and S6 of FIG. 7, the delivery member 78 transfers the clutch hub 1 after correction to the runout check section 74 to check whether the runout of the armature surface 141 has become equal to or less than a specified value. The configuration of the runout check section 74 is similar to that of the runout measurement section 72. If the runout is equal to or less than a specified value, control proceeds to step S7 where the clutch hub 1 is conveyed from the discharge conveyor 75 for the subsequent steps. Then, at step S8, the armature surface 141 is subjected to finishing grinding using a well-known grinding device.

In the finishing grinding of the armature surface 141, the runout that has remained after the correction of runout is removed. In the present embodiment, since the surface runout is substantially completely corrected by the runout correction section 73, only a little time and work is required for the finishing grinding. Thus, comparing with the runout correction using the conventional grinding, the processing time is remarkably shortened. Accordingly, productivity is greatly enhanced, and the clutch hub 1 having high quality can be manufactured.

The deformation processing apparatus for correcting surface runout 73 according to the present embodiment can be effectively used in the process of manufacturing clutch hubs of not only the air conditioners for automobiles but also various power transmission devices. Further, surface runout of a clutch hub is efficiently corrected by configuring the deformation processing system 50 for correcting surface runout, which includes the deformation processing apparatus for correcting surface runout 73.

What is claimed is:

1. An apparatus for correcting surface runout caused in an end surface of an annular armature in a clutch hub including an axial member disposed at a center portion of a sheet-metal hub member, the axial member being projected from a plate surface of the hub member, the annular armature being fixed to an outer peripheral portion on an axial member side of the hub member, the apparatus comprising:

a support member elastically supporting the end surface of the annular armature, the clutch hub being mounted on the support member and being orientated such that the axial member extends in a downward direction with respect to the huh member;

a press mechanism including a cylindrical pressing member positioned above the hub member, the press mechanism being configured to cause a driving means to descend the pressing member to press the hub member; and a fixing member positioned below the hub member, the fixing member including a locating portion configured to oppose a predetermined position of the plate surface of the hub member based on surface runout caused in the end surface of the armature, wherein when the pressing member is depressed, the pressing member plastically deforms the plate surface of the hub member by applying the locating portion as a fulcrum, and the plate surface of the hub member is plastically deformed by an amount equal to an inclination of the axial member with respect to the end surface of the armature such that the inclination of the axial member with respect to the end surface of the armature is corrected, and the locating portion of the fixing member is arranged on a line connecting a maximum-runout position in the end surface of the armature measured in advance and the axial member.

2. The apparatus for correcting surface runout according to claim 1, further comprising:

a chuck contacting a side face of the axial member of the hub member, the chuck being configured to restrict displacement in a rotation direction of the clutch hub.

3. The apparatus for correcting surface runout according to claim 2, wherein the support member includes:

a retainer plate that contacts the end surface of the armature; and an elastic support leg that includes a spring member configured to urge the retainer plate in an upward direction.

4. The apparatus for correcting surface runout according to claim 3, wherein an amount of depression of the pressing member produced by the press mechanism is set to the sum of an amount of plastic deformation, which is based on an amount of runout in the end surface of the armature measured in advance, and an amount of elastic deformation of the hub member.

5. The apparatus for correcting surface runout according to claim 4, wherein the locating portion of the fixing member is formed on an arc-shaped surface that is coaxial with the hub member.

6. The apparatus for correcting surface runout according to claim 3, wherein the locating portion of the fixing member is formed on an arc-shaped surface that is coaxial with the hub member.

7. The apparatus for correcting surface runout according to claim 2, wherein an amount of depression of the pressing member produced by the press mechanism is set to a su of an amount of plastic deformation, which is based on an amount of runout in the end surface of the armature measured in advance, and an amount of elastic deformation of the hub member.

8. The apparatus for correcting surface runout according to claim 7, wherein the locating portion of the fixing member is formed on an arc-shaped surface that is coaxial with the hub member.

9. The apparatus for correcting surface runout according to claim 2, wherein the locating portion of the fixing member is formed on an arc-shaped surface that is coaxial with the hub member.

10. The apparatus for correcting surface runout according to claim 1, wherein the support member includes:

a retainer plate that contacts the end surface of the armature; and an elastic support leg that includes a spring member configured to urge the retainer plate in an upward direction.

11. The apparatus for correcting surface runout according to claim 10, wherein an amount of depression of the pressing member produced by the press mechanism is set to the sum of an amount of plastic deformation, which is based on an amount of runout in the end surface of the armature measured in advance, and an amount of elastic deformation of the hub member.

12. The apparatus for correcting surface runout according to claim 11, wherein the locating portion of the fixing member is formed on an arc-shaped surface that is coaxial with the hub member.

13. The apparatus for correcting surface runout according to claim 10, wherein the locating portion of the fixing member is formed on an arc-shaped surface that is coaxial with the hub member.

14. The apparatus for correcting surface runout according to claim 1, wherein an amount of depression of the pressing member produced by the press mechanism is set to a sum of an amount of plastic deformation, which is based on an amount of runout in the end surface of the armature measured in advance, and an amount of elastic deformation of the hub member.

15. The apparatus for correcting surface runout according to claim 14, wherein the locating portion of the fixing member is formed on an arc-shaped surface that is coaxial with the hub member.

16. The apparatus for correcting surface runout according to claim 1, wherein the locating portion of the fixing member is formed on an arc-shaped surface that is coaxial with the hub member.

\* \* \* \* \*